(12) United States Patent
Volkmann et al.

(10) Patent No.: US 11,820,102 B2
(45) Date of Patent: Nov. 21, 2023

(54) NONPERMEABLE COMPOSITE MATERIAL

(71) Applicant: Zephyros, Inc., Romeo, MI (US)

(72) Inventors: Markus Volkmann, Kirchworbis (DE); Radka Pigová, Košice-Šaca (SK)

(73) Assignee: Zephyros, Inc., Romeo, MI (US)

(*) Notice: Subject to any disclaimer, the term of this patent is extended or adjusted under 35 U.S.C. 154(b) by 169 days.

(21) Appl. No.: 16/482,785

(22) PCT Filed: Feb. 5, 2018

(86) PCT No.: PCT/US2018/016793
§ 371 (c)(1),
(2) Date: Aug. 1, 2019

(87) PCT Pub. No.: WO2018/144967
PCT Pub. Date: Aug. 9, 2018

(65) Prior Publication Data
US 2020/0230909 A1   Jul. 23, 2020

Related U.S. Application Data

(60) Provisional application No. 62/455,139, filed on Feb. 6, 2017.

(51) Int. Cl.
*B32B 1/08* (2006.01)
*B32B 5/02* (2006.01)
(Continued)

(52) U.S. Cl.
CPC ............ *B32B 1/08* (2013.01); *B32B 5/022* (2013.01); *B32B 5/26* (2013.01); *B32B 7/02* (2013.01);
(Continued)

(58) Field of Classification Search
CPC .. B32B 1/08; B32B 5/022; B32B 5/08; B32B 5/26; B32B 7/02; B32B 7/10;
(Continued)

(56) References Cited

U.S. PATENT DOCUMENTS

2003/0077969 A1* 4/2003 Tanaka .................. D04H 1/559
442/334
2006/0090958 A1  5/2006 Coates et al.
(Continued)

FOREIGN PATENT DOCUMENTS

JP    2008-281276 A    11/2008
JP    2008281276 A  * 11/2008
(Continued)

OTHER PUBLICATIONS

English Machine translation of the description of JP-2008281276-A, obtained from Espacenet (Year: 2008).*
(Continued)

*Primary Examiner* — Eli D. Strah
*Assistant Examiner* — Thomas J Kessler
(74) *Attorney, Agent, or Firm* — The Dobrusin Law Firm, P.C.

(57) ABSTRACT

A composite material having a plurality of discrete layers layered on top of each other including a thermoformable foil or film layer; a core material layer; and a nonwoven material layer. The nonwoven material layer is adapted to face a stream of air and the core material layer is sandwiched between the nonwoven material layer and the thermoformable foil or film layer. The composite material may be used to form an air duct.

17 Claims, 2 Drawing Sheets

(51) Int. Cl.
  *B32B 5/26* (2006.01)
  *B32B 27/12* (2006.01)
  *B32B 27/40* (2006.01)
  *G10K 11/168* (2006.01)
  *B32B 7/02* (2019.01)

(52) U.S. Cl.
  CPC .............. *B32B 27/12* (2013.01); *B32B 27/40* (2013.01); *G10K 11/168* (2013.01); *B32B 2250/03* (2013.01); *B32B 2250/24* (2013.01); *B32B 2262/0253* (2013.01); *B32B 2262/0284* (2013.01); *B32B 2307/102* (2013.01); *B32B 2307/7242* (2013.01); *Y10T 428/13* (2015.01); *Y10T 428/139* (2015.01); *Y10T 428/1352* (2015.01); *Y10T 428/1355* (2015.01); *Y10T 428/1362* (2015.01); *Y10T 428/1393* (2015.01)

(58) Field of Classification Search
  CPC ......... B32B 27/12; B32B 27/36; B32B 27/40; B32B 2250/03; B32B 2250/24; B32B 2262/0253; B32B 2262/0276; B32B 2262/0284; B32B 2262/14; B32B 2270/00; B32B 2274/00; B32B 2307/102; B32B 2307/724; B32B 2307/7242; B32B 2307/7244; B32B 2307/732; B32B 2597/00; G10K 11/168; Y10T 428/13; Y10T 428/1352; Y10T 428/1355; Y10T 428/1362; Y10T 428/139; Y10T 428/1393
  See application file for complete search history.

(56) References Cited

U.S. PATENT DOCUMENTS

| | | |
|---|---|---|
| 2010/0000640 A1 | 1/2010 | Kierzkowski et al. |
| 2011/0139543 A1 | 6/2011 | Coates et al. |
| 2011/0293911 A1 | 12/2011 | Coates et al. |
| 2012/0024626 A1 | 2/2012 | Coates et al. |
| 2012/0058289 A1 | 3/2012 | Coates et al. |
| 2015/0330001 A1 | 11/2015 | Coates et al. |
| 2017/0088750 A1 | 3/2017 | Bush |
| 2017/0362837 A1 | 12/2017 | Shugg et al. |
| 2017/0372688 A1 | 12/2017 | Bush et al. |
| 2018/0005620 A1 | 1/2018 | Bush |
| 2018/0047380 A1 | 2/2018 | Bush |
| 2018/0126691 A1 | 5/2018 | Bush et al. |

FOREIGN PATENT DOCUMENTS

| | | | |
|---|---|---|---|
| JP | 4647978 B2 * | 3/2011 | ............... F16L 9/22 |
| KR | 2014-0074554 A | 6/2014 | |
| WO | 02/09089 A1 | 1/2002 | |
| WO | 2005/081226 A1 | 9/2005 | |
| WO | 2016/187526 A1 | 11/2016 | |
| WO | WO-2016187526 A1 * | 11/2016 | ............... B32B 7/00 |
| WO | 2017/192529 A1 | 11/2017 | |
| WO | 2018/075734 A1 | 4/2018 | |
| WO | 2018/144967 A1 | 8/2018 | |
| WO | 2018/156691 A1 | 8/2018 | |

OTHER PUBLICATIONS

English Machine translation of the claims of JP-2008281276-A, obtained from Espacenet (Year: 2008).*
Fabric, 2022, dictionary.com (Year: 2022).*
English Machine translation of the description of JP-4647978-B2 obtained from Espacenet (Year: 2011).*
English Machine translation of the claims of JP-4647978-B2 obtained from Espacenet (Year: 2011).*
International Search Report and Written Opinion for International Application PCT/US2018/016793, dated Apr. 10, 2018.

* cited by examiner

NONPERMEABLE COMPOSITE MATERIAL

FIELD

The present teachings relate generally to a non-permeable composite material, and more particularly, to a non-permeable composite material which enables acoustic absorption and low leakage of air within a system.

BACKGROUND

Industry is constantly seeking new and/or improved materials and methods of providing sound and noise reduction in a variety of applications. Materials that exhibit sound absorption characteristics are often employed as a way to provide noise reduction in a wide range of industrial, commercial, and domestic applications. It is often desirable to reduce noises of machinery, engines, and the like. For example, in automotive applications, it may be undesirable for a passenger to hear noises coming from the air conditioning unit or from other places of the vehicle. Industry is also constantly seeking new methods and materials for lightweighting, such as for achieving better fuel efficiency and handling, without sacrificing the performance of the parts.

Air ducts, such as those within a vehicle, are commonly made of molded parts, such as by injection molding or by blow molding. However, injection molded parts can be heavy. In addition, these molded parts may not provide adequate sound absorption characteristics. As these rigid parts are connected within an assembly, such as by fasteners, rattling or squeaking noises may be heard as the parts rub against each other or vibrate (e.g., due to the air flowing through, due to the movement of the assembly, such as when driving a vehicle, or both).

Other air ducts are made of textile materials. However, these textile ducts experience air leakage through the material, which is disadvantageous, since the air is intended to be pumped to the area to be heated or cooled, not to escape before reaching the intended area. In air duct systems, it is important that the air traveling though the duct does not pass through the walls of the duct.

Therefore, there is a need for new and/or improved materials for reducing leakage of air, for providing sound absorption characteristics, for reducing rattling or squeaking within the assembly, for providing a lower weight material, or a combination thereof.

SUMMARY

The present teachings meet one or more of the above needs by the improved devices and methods described herein. The present teachings provide improved sound absorption by creating a multi-layer, non-permeable composite material that allows for reduction of weight; reduction of undesirable noises, such as those able to be heard by a vehicle occupant; reduction of air passing through the material; or a combination thereof. The composite material as described herein may also be formed into a sheet and then shaped to form a desired structure such as to form an air duct.

The present teachings include any of the following features in any combination. The present teachings contemplate a composite material having a plurality of discrete layers layered on top of each other. The layers may include a thermoformable foil or film layer; a core material layer; a nonwoven material layer: or a combination thereof. The nonwoven material layer may be adapted to face a stream of air. The core material layer may be sandwiched between the nonwoven material layer and the thermoformable foil or film layer. The nonwoven material layer may be an air permeable layer, which may allow for air to travel through the layer and into the core material layer. The nonwoven material layer may be a flexible textile material, which may be formed from polyester fibers. The core material layer may comprise short fibers having an average fiber length of about 12 mm or less. The core material layer may be created from a blend of polyolefin and polyester based fibers. The thermoformable foil or film layer may be substantially non-permeable by air. The composite material may exhibit about 90% to about 100% less air leakage through the composite as compared to a composite material without the thermoformable foil or film layer. The thermoformable foil or film layer may be a multi-layer barrier film formed from thermoplastic polymers. The thermoformable foil or film layer may be formed from thermoplastic polyurethane and/or thermoplastic polyester elastomers. The composite material may further comprise an additional nonwoven material located between the thermoformable foil layer and the core material layer. It is contemplated that each layer of the plurality of layers may have a specific air flow resistance that is different from a layer directly adjacent. The composite material may be formed into a sheet. The sheet may be formed by thermally activating the layers in an air-circulating oven, or by another heating system, and compressing to a desired thickness. The sheet formed may then be molded into a three-dimensional part. The composite material, or a plurality of composite materials, may be shaped to form an air duct, wherein the nonwoven material layer is an inner layer of the air duct and the foil or film layer is an outer layer of the air duct.

The present teachings also contemplate an air duct. The air duct may include a plurality of discrete layers layered on top of each other. The layers may include a substantially non-permeable thermoformable foil or film layer; a core material layer; and a nonwoven material layer. The layers may be thermoformed into a generally hollow shape defining a channel for the passage of air within the channel. The nonwoven material layer is adapted to face the air and the core material layer is sandwiched between the nonwoven material layer and the thermoformable foil or film layer. The nonwoven material layer may be an air permeable layer. The nonwoven material layer may be a flexible textile material. The nonwoven material layer may be formed, at least in part, from polyester fibers. The core material layer may be formed from or may include short fibers having an average fiber length of about 12 mm or less. The core material layer may be created from a blend of polyolefin and polyester based fibers. The air duct may exhibit 90% to about 100% less air leakage through the layers of the duct as compared to an air duct without the thermoformable foil or film layer. The thermoformable foil or film layer may be a multi-layer barrier film formed at least partially from thermoplastic polymers. The thermoformable foil or film layer may be formed from thermoplastic polyurethane and/or thermoplastic polyester elastomers. The air duct may further include an additional nonwoven material located between the thermoformable foil layer and the core material layer. Each layer of the plurality of layers may have a specific air flow resistance that is different from a layer directly adjacent.

The present teachings also contemplate the methods of making the composite material (and a resulting three-dimensional structure, such as an air duct). The method including forming all of the layers, thermally activating the layers (e.g., in an air circulating oven) and compressing the layers to a desired thickness. Further molding steps and cutting steps are also contemplated. Multiple shaped structures can also be attached to each other, such as by adhesives or fasteners, to form a completed product.

DETAILED DESCRIPTION

Figure 1:
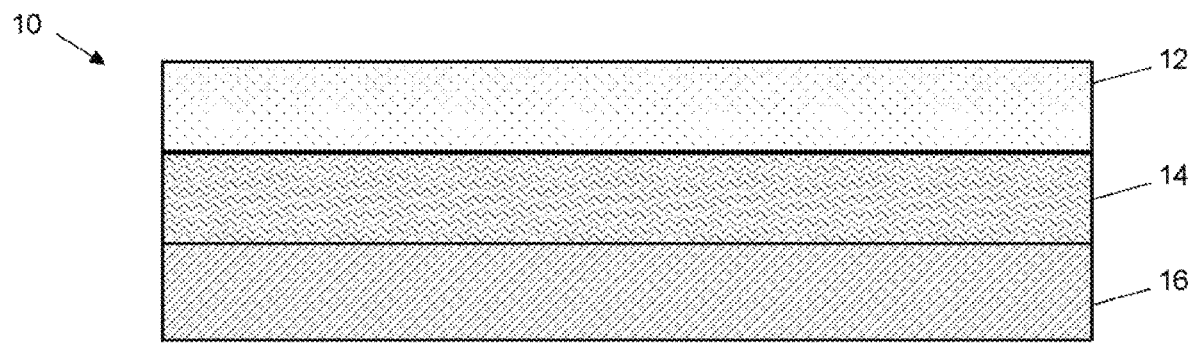
FIG. 1 is a cross-sectional view of a non-permeable composite in accordance with the present teachings.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Composite materials, such as the materials as discussed herein, may have a wide range of applications, such as where sound absorption is desired. These materials may also be employed where a reduction in air leakage through the material is desired. For example, and not to serve as limiting, acoustic materials may be used in automotive applications, generator set engine compartments, commercial vehicle engines, in-cab areas, architectural applications, and even heating, ventilating and air conditioning (HVAC) applications. The materials may be suitable for use in air ducts. The composite materials may be suitable for (but not limited to) use as sound attenuation materials in vehicles, attenuating sound originating from outside a cabin of a motor vehicle and propagating toward the inside of the cabin. The composite materials may be suitable for attenuating sound within or surrounding an air duct. The composite materials may provide sound absorption so that air flowing through the air duct is inaudible or less audible than if flowing through another medium. The composite materials may be used for machinery and equipment insulation, motor vehicle insulation, domestic appliance insulation, dishwashers, and commercial wall and ceiling panels. Composite materials may be used in the engine cavity of a vehicle, on the inner and outer dash panels and under the carpeting in the cabin, for example. Composite materials may be used inside cabs to provide acoustic absorption. Composite materials may be used in any application where a lighter weight acoustic material is desired. Composite materials may be used as interior decorative trim, in which case it may be necessary to face the acoustic sheet with some form of decorative fabric or other covering. The acoustic sheets may be used in combination with other sound absorption materials. Composite materials may also be useful as an acoustic pin board material or as a ceiling tile.

Composite products, such as composite acoustic materials, may be formed, at least in part, from porous limp sheets with relatively high air flow resistances, porous bulk absorbers or spacer materials having air flow resistances substantially smaller than the limp sheets, or both. Methods for producing such composite products include those set out in co-owned International Application No. PCT/AU2005/000239 entitled "Thermoformable Acoustic Product" (published as WO/2005/081226), the contents of which are hereby incorporated herein by reference.

In general, materials used for sound absorption (e.g., composite acoustic materials, nonwoven materials, woven materials, the like, or combination thereof) must exhibit air permeability properties. Critical characteristics include air flow resistance (resistance to air flow through the material), tortuosity (the path length of a sound wave within the material), and porosity (void to volume ratio). With fibrous materials, air flow resistance is an important factor controlling sound absorption. However, it is contemplated that they layers of the composite material as disclosed herein have different air permeability properties. For example, one or more layers may allow air to pass through the materials or pores of the materials. One or more layers may inhibit air from passing through the material. This may allow to sound absorption without allowing the air to escape through the material. The resulting structure may be a non-permeable composite material, where non-permeable is understood to mean that about 10 percent or less, about 5 percent or less, or even about 1 percent or less of air contacting the material is permitted to pass through the entirety of the material. Non-permeable may be defined as no air being permitted to pass through the entirety of the material (i.e., through the entire thickness of the material). Non-permeability may also be defined in terms of pressure drop by measuring the pressure of the air on one side of the material and the pressure of air on the other side of the material (where the sides define the thickness of the material).

Air flow resistance is measured for a particular material at a particular thickness. The air flow resistance is normalized by dividing the air flow resistance (in Rayls) by the thickness (in meters) to derive the air flow resistivity measured in Rayls/m. ASTM standard C522-87 and ISO standard 9053 refer to the methods for determination of air flow resistance for sound absorption materials. Within the context of the described embodiments, air flow resistance, measured in mks Rayls, will be used to specify the air flow resistance; however other methods and units of measurement are equally valid. Within the context of the described embodiments, air flow resistance and air flow resistivity can be assumed to also represent the specific air flow resistance, and specific air flow resistivity, respectively.

The sound absorption coefficient (SAC) and sound transmission loss (STL) level of an air permeable or porous material may be improved and tuned by layering materials together. These layers may have different levels of specific air flow resistance. The building of these types of layers creates a multi-acoustic impedance mismatched profile throughout the thickness of the composite. This mismatched profile amplifies the noise reduction capability (both SAC and STL) of the composite. The mismatched profile may also permit air to pass through certain layers but not others so that noise is reduced but the air is retained within the structure. Surprisingly, the results are a noise reduction and/or sound absorption at a greater level than that of the summation of the performance of the individual layers as standalone units. Therefore, the layers of materials produce a generally synergistic effect to improve sound absorption performance.

By utilizing the synergistic performance of a multi-layered composite, mass of material in each layer may be reduced in comparison to traditional single or dual layered acoustic material (e.g., a non-faced or single low air flow resistance (AFR) faced open cell foam or a single-scrim low AFR faced fiber). Reducing the mass of fiber in the matrix forming one or more layers of the composite may reduce material cost and/or manufacturing costs, as lighter weight layers may be produced more quickly than a heavier weight layer.

The performance of the multi-layer systems may be about the same as or may even exceed that of traditional materials. However, multi-layer systems may allow for lower overall composite thickness than traditional materials. The lower thickness of the multi-layer composite may allow for better fitment into packaging space constrained areas. Shipping improvements may be realized since more material can be shipped in a finite volume at equal or greater acoustic performance as compared to a heavier and/or thicker sound absorption product. The composite may function to absorb sound to reduce noise. The composite may include one or more layers, and preferably a plurality of layers. The layers may be of different materials. Some layers may be of the same materials. The type of materials forming the layers, order of the layers, number of layers, thickness of layers, or a combination thereof, may be chosen based on the air flow resistive properties of each material, the desired air flow resistive properties of the composite as a whole, the desired weight, density and/or thickness of the composite (e.g., based upon the space available in the vehicle where the composite will be installed), or a combination thereof. For example, some layers may have a lower air flow resistance while other layers may have a higher air flow resistance. The layering of layers having different air flow resistive properties may produce a multi-impedance acoustic mismatched profile through the entire acoustic composite, which provides improved noise reduction capability of the composite. Therefore, the layers may be arranged so that a layer of higher specific air flow resistance is joined to or is adjacent to one or more layers of a different specific air flow resistance (e.g., a lower air flow resistance).

Any of the materials described herein may serve as one or more layers of the composite. Any of the materials described herein may be combined with other materials described herein (e.g., in the same layer or in different layers of the composite). The composite may include a plurality of layers, some or all of which serve different functions or provide different properties to the composite (when compared to other layers of the composite). The ability to combine layers of materials having different properties may allow the composite to be customized based on the application. For example, one or more layers may provide structural properties to the composite or structure formed therefrom. One or more layers may provide air flow resistive properties to the composite or structure formed therefrom. One or more layers may provide non-permeable characteristics to the composite or structure formed therefrom. One or more layers may provide insulation. One or more composite layers may include one or more adhesive materials (e.g., as part of the fibers of the layer or as a separate element in or on the layer) for binding the fibers together, for binding layers together, for binding structures formed from the composite material together, or a combination thereof. One or more composite layers may support a facing material or top layer, such as a foil or film layer. One or more composite layers may provide heat resistance (e.g., if the composite is located in an area that is exposed to high temperatures). One or more composite layers may provide stiffness to the composite. One or more composite layers may provide flexibility and/or softness to the composite material. One or more composite layers may attach directly to a wall or surface of a substrate to provide acoustic absorption. One or more composite layers may be any material known to exhibit sound absorption characteristics. One or more composite layers may be at least partially formed from fibrous material. One or more composite layers may be at least partially formed as a web of material (e.g., a fibrous web). One or more composite layers may be formed from nonwoven material, such as short fiber nonwoven materials. One or more composite layers may be a film or foil, such as a thermoformable film or foil. One or more composite layers may be a porous bulk absorber (e.g., a lofted porous bulk absorber formed by a carding and/or lapping process). One or more composite layers may be formed by air laying. One or more layers or one or more components of the composite material may be formed by injection molding. The injection molded part or layer may be adhered or fastened, for example, to the composite material. The composite (or one or more of the composite layers) may be an engineered 3D structure. It is clear from these potential layers that there is great flexibility in creating an acoustic material that meets the specific needs of an end user, customer, installer, and the like.

One or more layers of the composite material may have a relatively high air flow resistance to present acoustic impedance to the sound pressure wave incident upon the material. Air permeability should be managed to ensure predictable and consistent performance. This may be achieved through management of fiber sizes, types, and lengths, among other factors. In some applications, desirable levels of air permeability may be achieved by combining plural nonwoven materials of differing densities together to form a composite product. A combination of materials having low permeability, or even substantially no permeability, with those having high permeability can be used to achieve locally reactive acoustic behavior. The composite material of the present teachings contemplates a combination of materials including one or more film or foil layers; one or more core material layers; one or more nonwoven material layers; or a combination thereof.

One or more layers of the composite may be a film, foil, or facing laminate. The film, foil, or facing layer may function as a non-permeable layer so that air is substantially prevented from passing through the layer (i.e., so that about 10% or less, about 5% or less, or about 1% or less of all air passes through the layer). The layer may provide protective properties to the composite material. The material(s) forming the layer may provide thermoformable properties to the layer, or to the composite material as a whole, so that the composite material may be shaped into a three-dimensional structure, for example. The layer may be a generally solid layer. The layer may be formed from one or more layers, or a plurality of layers.

The film, foil, or facing laminate may be impermeable. In such a case, the air flow resistance would be infinite, or near infinite. As air flow resistance is proportional to the inverse of the air permeability. As air permeability may be 0, or about 0, for a non-permeable material, the air flow resistance would then be infinite. Air permeability of the film, foil, or facing layer, may be about 0 l/m²/s or more, about 50 l/m²/s or more, or about 100 l/m²/s or more at 200 Pa. Air permeability of the film, foil, or facing layer, may be about 400 l/m²/s or less, about 300 i/m²/s or less, or about 250 l/m²/s or less at 200 Pa.

The film, foil, or facing laminate may be applied to another composite layer, which may act as a facing. The film may be any polymeric film, for example a polyester (e.g., PET) film, a polyurethane film, or both. While referred to as a layer, the film, foil, or facing laminate itself may be formed from one or more layers. The non-permeability of the layer may be achieved through a multi-layer film, such as a film formed from thermoplastic polyurethane and thermoplastic polyester elastomer-based layers. For example, the film, foil or facing laminate may include 1 or more layers, 2 or more layers, or 3 or more layers. The film, foil, or facing laminate may include 15 or fewer layers, 12 or fewer layers, or 10 or fewer layers. The foil or film layer may exhibit high thermal barrier properties and may remain stable at extreme temperatures. Exemplary film layers include APT 9924, available from Advance Packaging Technologies (Waterford, Michigan); or TC 4070 CX 20 B/A, available from Prochimir Technical Films (Pouzauges, France).

The film may be a reflective film. The facing laminate may be a foil (e.g., a reinforced foil, a metallic foil, or both). The foil may be laminated to another composite layer. For example, the foil may be a laminated reinforced aluminum foil. The layer may be applied over other layers of the composite to provide localized heat reflection without considerably sacrificing the properties of the underneath composite material and without reducing the acoustic absorption capacity of the existing base material (the one or more composite layers). For an outermost layer of the acoustic composite, to provide heat reflective properties and protect the composite layers underneath, the outermost layer may be metalized or aluminized. The outermost layer itself may be metallic (e.g., so that an additional metallization or aluminization step may not be necessary).

The film, foil or facing layer may be attached to one or more fibrous layers, such as a core layer, a nonwoven layer, or both. The fibers that make up one or more layers of the composite material may have a linear mass density from about 0.25 denier or greater, about 0.5 denier or greater, or about 1 denier or greater. The material fibers that make up the composite material or one or more layers thereof may be about 150 denier or less, about 120 denier or less, or about 100 denier or less. Certain layers may have an average denier that is higher than other layers. The average denier may depend upon the fibers used. For example, a layer having natural fibers may have an average denier of about 100 denier±about 20 denier. The fibers may have a staple length of about 0.5 mm or greater, about 1.5 millimeters or greater, or even up to about 70 millimeters or greater (e.g., for carded fibrous webs). For example, the length of the fibers may be between about 30 millimeters and about 65 millimeters, with an average or common length of about 50 or 51 millimeters staple length, or any length typical of those used in fiber carding processes. Fiber lengths may vary within a layer. For example, a core layer may have fibers ranging from about 1 mm or about 120 mm. The length of the fibers used may depend on the processing to form the layer. For example, a carded and/or needle punched layer may require fibers of a certain length (e.g., at least some of the fibers having a length of about 30 mm or longer). Short fibers may be used in some other nonwoven processes, such as the formation of air laid fibrous webs. For example, some or all of the fibers may be a powder-like consistency (e.g., with a fiber length of about 0.25 mm or more, about 0.5 mm or more, or about 1 mm or more; about 5 mm or less, about 4 mm or less, or about 3 mm or less). Fibers of differing lengths may be combined to form a composite layer. The fiber length may vary depending on the application, the acoustic properties desired, dimensions and/or properties of the acoustic material (e.g., density, porosity, desired air flow resistance, thickness, size, shape, and the like of the composite layer), or any combination thereof. More effective packing of the shorter fibers may allow pore size to be more readily controlled in order to achieve desirable acoustic characteristics, air flow characteristics, or both.

The fibers forming one or more composite layers may be natural or synthetic fibers. Suitable natural fibers may include cotton, jute, wool, cellulose and ceramic fibers. Suitable synthetic fibers may include polyester, polypropylene, polyethylene, Nylon, aramid, imide, acrylate fibers, or combination thereof. The composite layer material may comprise polyester fibers, such as polyethylene terephthalate (PET), and co-polyester/polyester (CoPET/PET) adhesive bi-component fibers. The fibers may be 100% virgin fibers, or may contain fibers regenerated from postconsumer waste (for example, up to about 90% fibers regenerated from postconsumer waste).

One or more layers of the composite may include a plurality of bi-component fibers. The bi-component fibers may include a core material and a sheath material around the core material. The sheath material may have a lower melting point than the core material. The web of fibrous material may be formed, at least in part, by heating the material to a temperature to soften the sheath material of at least some of the bi-component fibers. The temperature to which the fibrous web is heated to soften the sheath material of the bi-component may depend upon the physical properties of the sheath material. For a polyethylene sheath, the temperature may be about 140 degrees C. to about 160 degrees C. For a polypropylene sheath, the temperature may be higher (for example, about 180 degrees C.). The bi-component fibers may be formed of short lengths chopped from extruded bi-component fibers. The bi-component fibers may have a sheath-to-core ratio (in cross-sectional area) of about 25% to about 35%.

The fibers of one or more layers of the composite material may be blended or otherwise combined with suitable additives such as other forms of recycled waste, virgin (non-recycled) materials, binders, fillers (e.g., mineral fillers), adhesives, powders, thermoset resins, coloring agents, flame retardants, longer staple fibers, nylons, viscose, active carbons, other polymers, etc., without limitation. The layers themselves may be formed from any of these materials, alone or in combination. The fibers or layers of the composite material may undergo additional treatments, such as to make the resulting structure suitable for use in hygienic applications.

The fibers forming one or more layers of composite material may be formed into a nonwoven web using nonwoven processes including, for example, blending fibers (e.g., blending bi-component fibers, conventional staple fibers, or combination thereof), carding, lapping, air laying, mechanical formation, or combination thereof. The fibers of one or more composite layers may be opened and blended using conventional processes. The fibers may be blended within the structure of the fibrous web. A carded web may be cross-lapped or vertically lapped, to form a voluminous nonwoven web. The carded web may be vertically lapped according to processes such as "Struto" or "V-Lap", for example. This construction provides a web with relative high structural integrity in the direction of the thickness of the composite sound absorber, thereby minimizing the probability of the web falling apart during application, or in use. Carding and lapping processes create a nonwoven fiber layer that has good compression resistance through the vertical cross-section and enables the production of a lower mass acoustic treatment, especially with lofting to a higher thickness without adding significant amounts of fiber to the matrix. It is contemplated that a small amount of hollow conjugate fiber (i.e., in a small percentage) may improve lofting capability and resiliency to improve sound absorption. Such an arrangement also provides the ability to achieve a low density web with a relatively low bulk density. An air laid or mechanically formed web may also be produced, though formation of a bulk layer by a lapping process may enable higher thickness at lower weights (or lower densities) as compared to air laying. The web may then be thermally bonded, air bonded, mechanically consolidated, the like, or combination thereof, to form a cohesive nonwoven insulation material.

The fibers may be used to form a core material. The core material of the present teachings may be formed from a blend of fibers, including short fibers. The core material may be a short fiber technology-based (SFT-based) material. The SFT-based material may be formed using any processes for arranging fibers, such as gravity deposition, air laying, carding, lapping, or any combination thereof. The SFT-based materials may be densified, such as by compressing the materials, calendering the materials, or another employing another method of pressing.

In some applications, the use of shorter fibers may have advantages in relation to the performance of the acoustic material. The selected air flow resistivity achieved using short fibers may be significantly higher than the air flow resistivity of a conventional nonwoven material comprising substantially only conventional staple fibers having a long length of, for example, from at least about 30 mm and less than about 100 mm. Without being limited by theory, it is believed that this unexpected increase in air flow resistance may be attained as a result of the short fibers being able to pack more efficiently (e.g., more densely) in the nonwoven material than long fibers. The shorter length may reduce the degree of disorder in the packing of the fibers as they are dispersed onto a surface, such as a conveyor, or into a preformed web during production. The more ordered packing of the fibers in the material may in turn lead to an increase in the air flow resistivity. In particular, the improvement in fiber packing may achieve a reduced interstitial space in between fibers of the nonwoven material to create a labyrinthine structure that forms a tortuous path for air flow through the material, thus providing a selected air flow resistance, and/or selected air flow resistivity. Accordingly, it may be possible to produce comparatively lightweight nonwoven materials without unacceptably sacrificing performance.

The composite material may include one or more layers that are air permeable. The air-permeable layer may be a layer adapted to face the source of air flow or to directly contact a stream of air, thereby allowing the air to travel into other layers of the composite (e.g., the core). The layer may, for example, define a cavity of an air duct. The layer may be a flexible material, which may provide flexibility to the composite material.

The air-permeable layer may be formed from a nonwoven material. The layer may be formed from a textile material. The layer may be formed by needle-punching, alone or in combination with any of the methods of forming layers described herein or known in the art. The layer may be compressed using one or more methods, such as with a press, laminator, set of calender rolls, or the like. The layer may be compressed and melted in a thermoforming step. The layer may be formed using any nonwoven technologies. For example, the layer may be spun bound, melt blown, cross-laid, compressed air laid, SMS, spunlaced, direct laid, wet laid, dry laid, the like, or a combination thereof. The layer may be formed from any fibers capable of being mechanically or thermally bonded to each other.

The composite may include an optional additional air permeable layer located between the film, foil, or facing layer and the core material layer. The layer may enhance the acoustic impedance mismatch, between the layers especially when positioned between the core material and the film, foil or facing material. As the layer is permeable, it may also act similarly to an air gap between the film, foil or facing material and the core material layer to further enhance acoustic absorption, as sound waves are permitted to pass through the inner air permeable material, core material layer and optional additional air permeable layer and reflect off of the film, foil, or facing material and back into the optional air permeable layer and core material layer (and any additional layers).

Each composite layer may be formed to have a thickness and density selected according to the required physical and air permeability properties desired of the finished composite layer (and/or the composite material as a whole). The composite layer may be any thickness depending on the application, location of installation, shape, fibers used (and the lofting of the composite layer), or other factors. The density of the composite layer may depend, in part, on the specific gravity of any additives incorporated into the material comprising the layer (such as nonwoven material), and/or the proportion of the final material that the additives constitute. Bulk density generally is a function of the specific gravity of the fibers and the porosity of the material produced from the fibers, which can be considered to represent the packing density of the fibers. The total thickness of the composite material may depend upon the number and thickness of the individual layers. The composite material is beneficial, as the thickness and properties can be tuned to have the desired weight, thickness, and acoustic and/or structural properties. The composite material can be customized. Customizations include the number of layers, types of layers, and compression of layers.

Considering the types of layers that may be used as described herein, the multi-layered system may vary the specific air flow resistances between the layers of the composite material to enhance sound absorption, reduce air leakage from the composite material, or both. The multi-layered system may have a top or outer layer (e.g., foil or film layer), and one or more layers below the top layer (e.g., one or more fibrous layers, such as a core layer, an air permeable layer, such as a flexible textile nonwoven material, or both). The top or outer layer of the composite may be a layer having a high air flow resistance, or may be substantially non-permeable. For example, the top or outer layer may have an air permeability of about 0 $l/m^2/s$ to about 250 $l/m^2/s$ at 200 Pa. The top or outer layer may be a film, facing laminate, or foil.

The composite layers may be bonded together to create the finished composite. One or more of the layers may be thermally activated. For example, the layers may be activated in an air-circulating oven. The layers may be activated by a heating system. The layers may be activated by IR heating. The layers may then be compressed to a desired thickness. For example, compression may occur through a lamination process or a calendering process. One or more layers may be bonded together by elements present in the layers. For example, binder fibers in the layers may serve to bond the layers together. The outer layers (i.e., the sheath) of bi-component fibers in one or more layers may soften and/or melt upon the application of heat, which may cause the fibers of the individual layers to adhere to each other and/or to adhere to the fibers of other layers. One or more adhesives may be used to join two or more layers. The adhesives may be a powder or may be applied in strips, sheets, or as a liquid, for example.

It is contemplated that the composite layers are assembled so that the film, foil, or facing is an outermost layer of the composite material, where outermost is understood to mean facing away from the stream of air, opposite the innermost layer. An air permeable layer, such as a needle punched non-woven material, may be the innermost layer of the composite material, where innermost is understood to mean facing the stream of air. The core material layer may be sandwiched between the film, foil or facing layer and the air-permeable layer. An optional additional air-permeable layer may be positioned between the film, foil or facing layer and the core material layer.

Other arrangements of layers are contemplated. For example, the layers may be arranged in another order. The composite material may include two or more of any layer as described herein. The air-permeable layers may be formed of the same material. The air-permeable layers may be formed of different materials. Any or all of the layers may be co-extensive with one or more of the other layers. One or more of the layers may extend over only part of an adjacent layer.

The finished composite material may be formed into a sheet. As any or all of the layers may contain one or more thermoplastic and/or thermoset materials (e.g., binders), the composite material may be heated and thermoformed into a specifically shaped thermoformed product. Acoustic properties of the composite (and/or its layers) may be impacted by the shape of the composite. The composite, or one or more of its layers, may be generally flat. The finished composite may be fabricated into cut-to-print two-dimensional flat parts for installation into the end user, installer, or customers assembly. The composite may be formed into any shape. For example, the composite may be molded to generally match the shape of the area to which it will be installed. The finished composite may be molded-to-print into a three-dimensional shape for installation into the end user, installer, or customer's assembly. The three-dimensional geometry of a molded product may provide additional acoustic absorption. The three-dimensional shape may provide structural rigidity and an air space.

For example, one or more sheets of composite material may be shaped to form a generally hollow member, such as an air duct, where the composite material defines one or more channels through which air or another fluid can travel. A single sheet may be thermoformed to form the generally hollow member. Two or more sheets may be thermoformed into a generally hemispherical or half-circular shape, for example. The sheets may be formed to have a lip portion at the edges, and the sheets may be joined together at the lip portions to form a full circle, oval, or other hollow shape. The foil or film layer may be arranged to face outwardly to reduce or prevent air leakage from the generally hollow member such as an air duct.

The finished structure may include one or more features for securing the structure in a desired assembly. For example, the structure, such as an air duct, may include one or more apertures (e.g., formed in a lip portion) for receiving a fastener. The structure may include one or more features molded, adhered, fastened, or otherwise attached to the outer layer of the structure, which may allow for the structure to be clipped or snapped to another element of the assembly. The structure may include a cutout or other feature that allows a temperature sensor to measure and regulate the air flowing through the duct. The finished structure may include one or more bridge segments to join two or more elements, such as air ducts, for example. The finished structure may provide structural support within the assembly. The finished structure may serve to support other parts. The finished structure may exhibit compression resistance to maintain the shape of the duct, to maintain support of other elements within the assembly, or both.

The finished, assembled composite, as a result of layering composite layers, may be a lighter weight and higher performing composite material (e.g., as compared with a denser, heavier, and/or thicker lofted layer, such as those traditionally used). The composite material may have a better value proposition (e.g., performance versus cost) than traditional sound absorption materials. The finished composite material comprises a material whose properties can be adjusted via many methods. Adjustment can be made by the use of one or more materials having a high specific air flow resistance. Adjustment can be made by altering thickness, density, fiber matrix, chemistry, method of bonding, and the like for each layer of the composite. It is contemplated that the composite may have any of the following advantages over other materials traditionally used; better non-acoustic properties, such as better temperature resistance, hydrolytic stability, compression resistance, and mold/mildew resistance (versus foams and natural fiber, for example); better compression resistance and performance stability (versus mineral wool, for example); easier fabrication and installation (versus perforated metal panels, for example); easier molding and creation of a lower VOC and/or lower toxicity (versus resonated natural fiber and fiberglass type products, for example); improved flexibility and/or softness (versus a honeycomb structure, for example); improved ability to mold into a desired shape (versus a honeycomb structure, for example); improved ability to tune more parameters in the absorption matrix, such as fibers, layers, thickness, and bulk density (versus a honeycomb structure, for example); higher thicknesses at lower weights or densities (versus honeycomb structures or bulk absorption layers formed by air laying, for example).

Turning now to the figures, FIG. 1 illustrates an exemplary non-permeable composite material 10. The non-permeable composite material 10 includes a nonwoven material 12, which may be a needle punched nonwoven material; a core material 14, which may be a polyethylene and polypropylene mix; and a foil or film material 16, which may be thermoformable. The non-permeable composite material 10 is formed into a sheet, which is then shaped into a desired three-dimensional structure.

Figure 2:
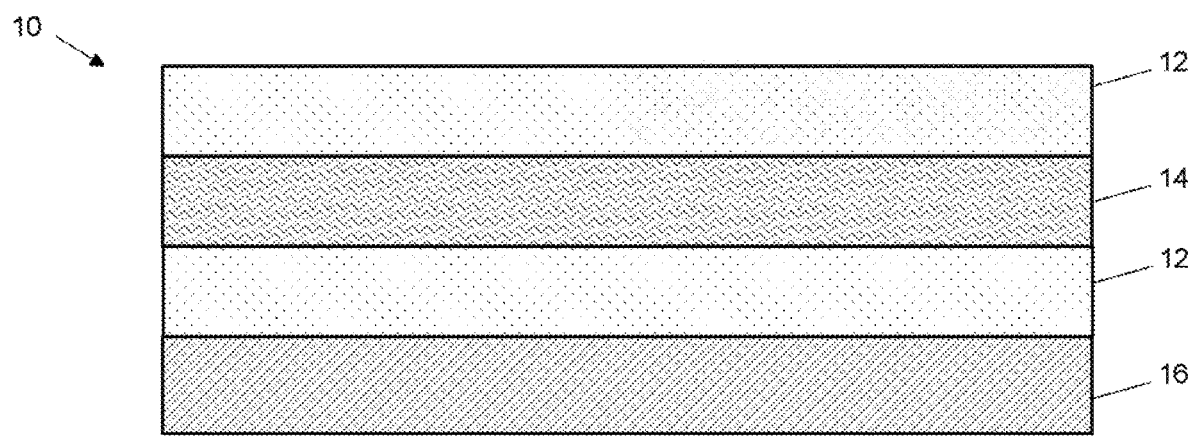
FIG. 2 is a cross-sectional view of a non-permeable composite in accordance with the present teachings.

FIG. 2 illustrates an exemplary non-permeable composite material 10 having an additional nonwoven material layer 12, sandwiched between the core material 14 and the foil or film material 16.

Figure 3:
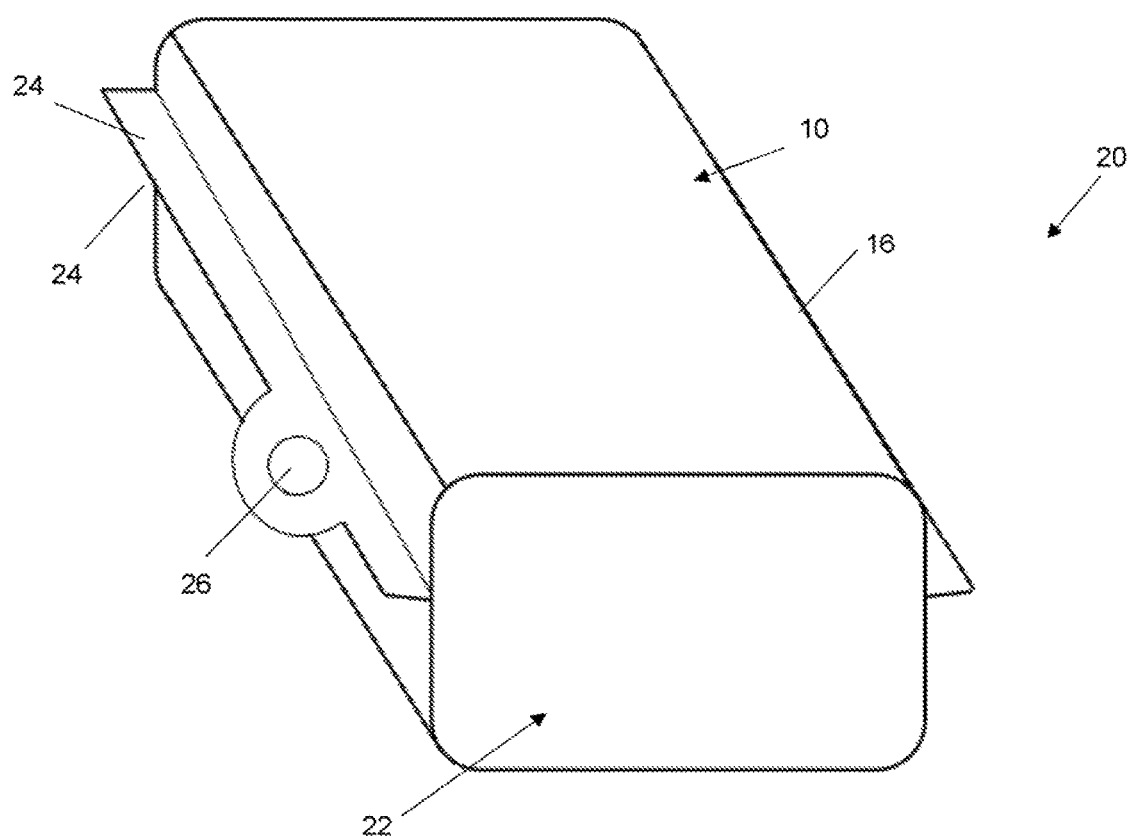
FIG. 3 is an exemplary structure formed of the non-permeable composite in accordance with the present teachings.

FIG. 3 illustrates a three-dimensional structure formed from a non-permeable composite material 10. Two sheets of the non-permeable composite material 10 are shaped and joined to form an air duct 20, having a channel 22, through which air (or other fluids) are permitted to travel. The sheets of non-permeable composite material 10 are joined together at a lip 24, and the foil or film material 16 faces outwardly, thereby preventing air from leaking out of the air duct 20. The air duct 20 includes an optional opening 26, which permits the air duct 20 to be secured within an assembly, and is adapted to receive one or more fasteners. The air duct may include one or more additional features to provide access to the interior of the duct. For example, an opening or other attachment may be secured to the duct to allow a thermometer or other device to penetrate the duct to measure the temperature of the air flowing through.

Figure 4:
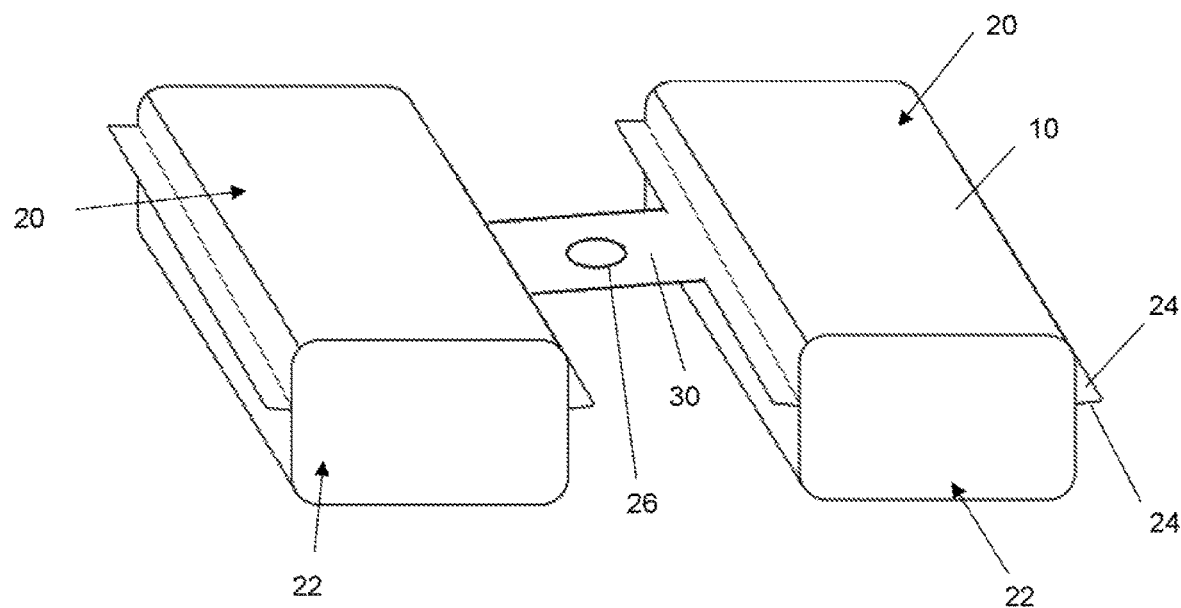
FIG. 4 is an exemplary structure formed of the non-permeable composite in accordance with the present teachings.

FIG. 4 illustrates another three-dimensional structure formed from the non-permeable composite material 10. Sheets of the non-permeable composite material 10 are shaped and joined at lips 24 defining a channel 22 to form two air ducts 20, through which air or other fluids are permitted to travel. The air ducts 20 are joined by a bridge 30. The bridge 30 includes an optional opening 26 adapted to receive a fastener for securing the air ducts 20 within an assembly.

Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32, etc. are expressly enumerated in this specification. For values which are less than one, one unit is considered to be 0.0001, 0.001, 0.01, or 0.1 as appropriate. These are only examples of what is specifically intended and all possible combinations of numerical values between the lowest value, and the highest value enumerated are to be expressly stated in this application in a similar manner. Unless otherwise stated, all ranges include both endpoints and all numbers between the endpoints. The use of "about" or "approximately" in connection with a range applies to both ends of the range. Thus, "about 20 to 30 is intended to cover about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Rural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A composite material comprising:
a plurality of discrete layers layered on top of each other including:
a. a substantially non-permeable thermoformable multi-layer barrier film formed from thermoplastic polyurethane and/or thermoplastic polyester elastomers, wherein the thermoformable multi-layer barrier film exhibits an air permeability of about 0 $l/m^2/s$ to about 250 $l/m^2/s$ at 200 Pa;
b. a nonwoven core material layer, wherein the core material layer consists of fibers having an average fiber length of about 12 mm or less, and wherein the core material layer is created from a blend of polyolefin and polyester based fibers; and
c. an air permeable needlepunched nonwoven material layer; wherein the composite material is one of more sheets, wherein each sheet consists of the substantially non-permeable thermoformable multi-layer barrier film; the nonwoven core material layer; and the air permeable needlepunched nonwoven material layer;
wherein the one or more sheets are directly joined together at one or more lip portions to form a hollow member defining a channel;
wherein the one or more lip portions span a length of the hollow member and are parallel to a longitudinal axis of the channel;
wherein the composite material is shaped to form an air duct;
wherein the needlepunched nonwoven material layer is an inner layer of the air duct configured to face a stream of air within the channel and the multi-layer barrier film is an outer layer of the air duct; and
wherein the core material layer is directly sandwiched between the needlepunched nonwoven material layer and the multi-layer barrier film.

2. The composite material of claim 1, wherein the needlepunched nonwoven material layer is a flexible material formed from polyester fibers.

3. The composite material of claim 1, wherein the core material layer is created from a blend of polypropylene and polyethylene terephthalate fibers.

4. The composite material of claim 1, wherein the composite material exhibits an air permeability of about 0 $l/m^2/s$ to about 250 $l/m^2/s$ at 200 Pa.

5. The composite material of claim 1, wherein each layer of the plurality of discrete layers has a specific air flow resistance that is different from a layer directly adjacent.

6. The composite material of claim 1, wherein the one or more sheets are formed by thermally activating the plurality of discrete layers in an air-circulating oven and compressing to a thickness.

7. The composite material of claim 1, wherein the one or more sheets are molded into a three-dimensional part.

8. The composite material of claim 1, wherein the multi-layer barrier film comprises a thermoplastic polyurethane layer and a thermoplastic polyester elastomer-based layer.

9. The composite material of claim 1, wherein the air duct is formed from two sheets joined directly together at lip portions to form the hollow member.

10. An air duct comprising:
two or more sheets molded into a three-dimensional part, wherein the two or more sheets are directly joined together at lip portions to form a hollow member defining a channel for passage of air within the channel, wherein the lip portions span a length of the hollow member and are parallel to a longitudinal axis of the channel, and wherein each sheet comprises:
a plurality of discrete layers layered on top of each other consisting of:
a. a substantially non-permeable thermoformable foil or film layer, wherein the thermoformable foil or film layer exhibits an air permeability of about 0 $l/m^2/s$ to about 250 l/m²/s at 200 Pa, wherein the thermoformable foil or film layer is formed from thermoplastic polyurethane and/or thermoplastic polyester elastomers;
b. a nonwoven core material layer, wherein the core material layer comprises fibers having an average fiber length of about 12 mm or less, and wherein the core material layer is created from a blend of polyolefin and polyester based fibers; and
c. an air permeable needlepunched nonwoven material layer;
wherein the plurality of discrete layers are thermoformed;
wherein the needlepunched nonwoven material layer is configured to face the air within the channel and the core material layer is directly sandwiched between the needlepunched nonwoven material layer and the thermoformable foil or film layer.

11. The air duct of claim 10, wherein the needlepunched nonwoven material layer is a flexible textile material formed from polyester fibers.

12. The air duct of claim 10, wherein the core material layer is created from a blend of polypropylene and polyethylene terephthalate fibers.

13. The air duct of claim 10, wherein the air duct exhibits an air permeability of about 0 l/m²/s to about 250 l/m²/s at 200 Pa through its thickness.

14. The air duct of claim 10, wherein the thermoformable foil or film layer is a multi-layer barrier film formed from thermoplastic polymers.

15. The air duct of claim 10, wherein each layer of the plurality of discrete layers has a specific air flow resistance that is different from a layer directly adjacent.

16. The air duct of claim 10, wherein the air duct consists of two sheets, each molded into a three-dimensional part, wherein the sheets are joined together at lip portions to form the hollow member defining the channel.

17. An air duct consisting of:
two sheets, each molded into a three-dimensional part, wherein the sheets are joined together at lip portions to form a hollow member defining a channel, wherein each sheet consists of:
a. a substantially non-permeable multi-layer thermoformable foil or film, wherein the thermoformable foil or film exhibits an air permeability of about 0 l/m²/s to about 250 l/m²/s at 200 Pa, and wherein the multi-layer thermoformable foil or film consists of a thermoplastic polyurethane layer and a thermoplastic polyester elastomer-based layer;
b. a nonwoven core material layer, wherein the core material layer consists of fibers having an average fiber length of about 12 mm or less, and wherein the core material layer is created from a blend of polyolefin and polyester based fibers; and
c. an air permeable needlepunched nonwoven material layer;
wherein the needlepunched nonwoven material layer faces the channel of the hollow member and the thermoformable foil or film forms an exterior of the hollow member; and
wherein the core material layer is sandwiched between the needlepunched nonwoven material layer and the thermoformable foil or film.

* * * * *